United States Patent
Nagel et al.

(10) Patent No.: US 10,100,701 B2
(45) Date of Patent: Oct. 16, 2018

(54) METHOD FOR THE DIAGNOSIS OF AN EXHAUST GAS AFTERTREATMENT SYSTEM FOR AN INTERNAL COMBUSTION ENGINE

(71) Applicant: Robert Bosch GmbH, Stuttgart (DE)

(72) Inventors: Cornelia Nagel, Stuttgart (DE); Alexander Franz, Gaertringen (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 18 days.

(21) Appl. No.: 15/445,155

(22) Filed: Feb. 28, 2017

(65) Prior Publication Data

US 2017/0248059 A1    Aug. 31, 2017

(30) Foreign Application Priority Data

Feb. 29, 2016  (DE) .................. 10 2016 203 227

(51) Int. Cl.
*F01N 9/00* (2006.01)
*F01N 3/08* (2006.01)
*F01N 3/20* (2006.01)
*F01N 13/00* (2010.01)

(52) U.S. Cl.
CPC .......... *F01N 9/002* (2013.01); *F01N 3/0814* (2013.01); *F01N 3/0842* (2013.01); *F01N 3/0885* (2013.01); *F01N 3/208* (2013.01); *F01N 3/2066* (2013.01); *F01N 13/009* (2014.06); *F01N 2430/06* (2013.01); *F01N 2550/02* (2013.01); *F01N 2570/14* (2013.01); *F01N 2900/04* (2013.01); *Y02A 50/2344* (2018.01); *Y02T 10/24* (2013.01)

(58) Field of Classification Search
CPC .... F01N 3/0814; F01N 3/0842; F01N 3/0885; F01N 3/2066; F01N 3/208; F01N 9/002; F01N 13/009; F01N 2430/06; F01N 2550/02; F01N 2570/14; F01N 2900/04; Y02A 50/2344; Y02T 10/24
See application file for complete search history.

(56) References Cited

FOREIGN PATENT DOCUMENTS

JP    WO 2015045378 A1 *  4/2015  ........... F01N 3/0814

* cited by examiner

*Primary Examiner* — Audrey K Bradley
(74) *Attorney, Agent, or Firm* — Michael Best & Friedrich LLP

(57) ABSTRACT

In a method for the diagnosis of an exhaust gas aftertreatment system for an internal combustion engine, the exhaust gas aftertreatment system comprises at least one NOx storage catalytic converter (10) and at least one SCR catalytic converter (30) which is arranged downstream of the NOx storage catalytic converter (10). According to the invention, a regeneration of the NOx storage catalytic converter (10) is blocked and/or interrupted in order to improve the frequency and/or quality of the diagnosis of the SCR catalytic converter (30).

10 Claims, 3 Drawing Sheets

Figure 1:
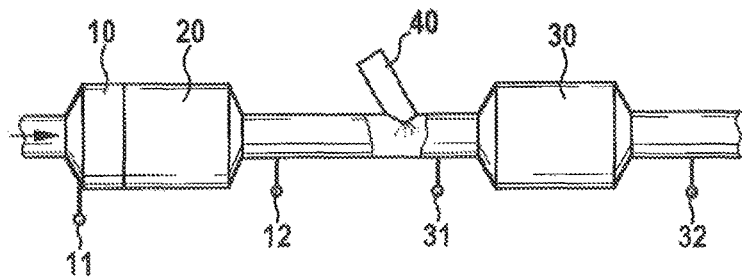

METHOD FOR THE DIAGNOSIS OF AN EXHAUST GAS AFTERTREATMENT SYSTEM FOR AN INTERNAL COMBUSTION ENGINE

BACKGROUND OF THE INVENTION

The present invention relates to a method for the diagnosis of an exhaust gas aftertreatment system for an internal combustion engine, the exhaust gas aftertreatment system having at least one NOx storage catalytic converter and at least one SCR catalytic converter which is arranged downstream of the NOx storage catalytic converter. Furthermore, the invention relates to a computer program, a machine-readable storage medium and an electronic control unit which are provided or set up for carrying out the diagnosis method.

In order to achieve the legally prescribed exhaust gas limit values during operation of motor vehicles, complex exhaust gas aftertreatment systems are used. Relatively strict laws in the field of the diagnosis of emissions-relevant components require, within the context of what is known as On Board Diagnosis (OBD), the monitoring of all exhaust gas aftertreatment components and the sensor system which is used with regard to the adherence to the OBD limit values.

It is already known to combine a nitrogen oxide storage catalytic converter (NSC—Nitrogen oxide Storage Catalyst) with an SCR catalytic converter (Selective Catalytic Reduction). The NOx-reducing (NOx—nitrogen oxides) effect of the NSC is based on the storage of NOx during regular lean operation of the engine. A regeneration of the NSC takes place by way of an intermittent supply of reducing agent in the exhaust gas, as a result of which the stored NOx can be reduced. This can take place, in particular, by way of rich operation of the engine ($\lambda<1$), the NSC being capable of absorbing NOx again after a regeneration of this type.

Since the rich operation which is carried out during the regeneration of the NSC increases the fuel requirement, the regeneration function for the NSC is as a rule applied by the vehicle manufacturer in such a way that it is carried out as rarely as possible but nevertheless as often as required, in order for it to be possible to adhere to the stipulated NOx emissions limits. The time of the regeneration is made dependent on superordinate criteria, such as the NOx loading of the NSC, and is therefore as a rule not temporally variable in a predefined driving cycle with the same start conditions, since this would lead either to an increased fuel consumption or to higher NOx emissions. Since monitoring (diagnosis) of the NSC can take place only during the regeneration, the time of the monitoring is stipulated by the time of the regeneration.

The basic principle of an SCR catalytic converter consists in that nitrogen oxide molecules are reduced to form elementary nitrogen on the catalytic converter surface in the presence of ammonia ($NH_3$) as reducing agent. The required reducing agent is introduced, in particular in the form of an aqueous urea solution, into the exhaust gas section by way of a metering device upstream of the SCR catalytic converter. For the diagnosis of the SCR catalytic converter, the NOx conversion rate of the SCR catalytic converter is usually determined with the aid of a NOx sensor which is arranged downstream of the SCR catalytic converter. For this purpose, the NOx mass flow downstream (sensor value) and upstream of the SCR catalytic converter (sensor or model value) is integrated at suitable operating points, and the NOx conversion rate is calculated therefrom (passive SCR diagnosis) after a NOx mass threshold is reached. In the case of an operating point change which is unfavorable for the monitoring quality, the NOx integration can be interrupted and can be restarted at a later time when the conditions have improved again. The SCR catalytic converter is considered to be defective if the conversion rate lies below a system-specific limit value.

The component monitoring of the individual catalytic converter devices is to take place in every driving cycle. An interrogation of the diagnosis frequency (cycles, in which the monitoring has been carried out, in relation to the overall number of cycles, in which the monitoring should have proceeded) takes place in practice by way of the standardized calculation of what is known as the IUMPR (In Use Monitoring Performance Ratio) in an electronic control unit. A minimum value, for example 0.33 (CARB OBD LEVII) is provided in general for the IUMPR by the legislator.

SUMMARY OF THE INVENTION

The method according to the invention is provided for the diagnosis of an exhaust gas aftertreatment system for an internal combustion engine, the exhaust gas aftertreatment system having at least one NOx storage catalytic converter (NSC) and at least one SCR catalytic converter which is arranged downstream of the NSC. By way of the diagnosis method according to the invention, the frequency and/or the quality of the diagnosis of the SCR catalytic converter can be improved under corresponding conditions by way of blocking and/or interruption of a regeneration of the NSC. In the case of conventional exhaust gas aftertreatment systems with NSC and SCR catalytic converters, the problem can occur that the diagnosis functions for the NSC and for the SCR catalytic converter block one another mutually if the release conditions of the NSC regeneration and monitoring and the release conditions for the SCR monitoring are selected in an optimum manner for the respective exhaust gas aftertreatment component. As a consequence, one or both diagnosis functions takes/take place too rarely, or the diagnosis quality is limited. The method according to the invention solves this problem with regard to the frequency and/or quality of the diagnosis of the SCR catalytic converter by the regeneration of the NSC being blocked and/or interrupted under certain conditions. The improvement according to the invention for the preconditions for carrying out the SCR diagnosis comes into effect, in particular, when the required diagnosis is not reliably possible under the given driving and exhaust gas conditions.

For an SCR diagnosis and, in particular, for the passive SCR diagnosis which has already been mentioned above with a high diagnosis quality, the NOx mass flow upstream of the SCR catalytic converter usually has to lie above a defined threshold. After an NSC regeneration, however, the NOx mass flow is very low for a certain time, since the emptied SCR can store NOx again. In addition, ammonia ($NH_3$) is produced during the NSC regeneration, which ammonia can lead to a falsification of the SCR diagnosis result on account of a cross-sensitivity of the NOx sensor which is used for the SCR diagnosis. Furthermore, the additional $NH_3$ mass flow can be predicted only with great difficulty, with the result that modeling of the data after an NSC regeneration is problematical. Therefore, the release of the SCR monitoring is usually blocked for a time after an NSC regeneration. This time period is then not available for the SCR monitoring. If an NSC regeneration takes place in a conventional system during running SCR monitoring, the NOx integration is interrupted and has to be restarted at a later time. This leads to the diagnosis duration for the SCR catalytic converter being lengthened. Furthermore, the diagnosis frequency and the diagnosis quality of the SCR monitoring in an exhaust gas aftertreatment system with NSC frequently suffers from reduced exhaust gas temperatures, since the cold start capability of the NSC is utilized, in order to dispense with exhaust gas heating measures largely or completely. As a result, although the fuel consumption of the vehicle can be reduced, the catalytic converter temperatures which are optimum for an SCR diagnosis are only reached comparatively late or rarely as a result. By way of the method according to the invention, these problems with regard to an insufficient frequency and/or quality of the SCR diagnosis can be solved by the regeneration of the NSC being blocked and/or interrupted. Said blocking and/or interruption of the regeneration of the NSC particularly advantageously takes place as an escalation measure which is initiated only if required. For example, a function can be provided which observes whether a provided frequency and/or quality of the SCR diagnosis is limited. If a limited frequency and/or quality of the SCR diagnosis is determined, the regeneration of the NSC is blocked and/or interrupted. This measure achieves a situation where the SCR diagnosis can be carried out in an optimum way. Secondly, it is ensured that a regeneration and thus an associated monitoring of the NSC is not excessively restricted, with the result that the required NSC regeneration and NSC diagnosis is also ensured in good time and with sufficient quality. Possible emissions influences as a result of the blocking of the NSC diagnosis are avoided here. For this purpose, the normal operation with possible NSC regenerations is preferably interrupted by the regeneration blocking only when the results of the SCR monitoring indicate possible accuracy problems or frequency problems. Here, the method according to the invention evaluates, in particular, the conditions in the exhaust gas system, in particular in conjunction with the operation of the NSC, which conditions lead to it not being possible for the SCR monitoring and/or diagnosis to be carried out sufficiently often or to the diagnosis taking too long.

It is advantageous for the method according to the invention if a diagnosis of the SCR catalytic converter is suspended as long as the internal combustion engine is operated with a rich exhaust gas composition ($\lambda<1$). Operating conditions of this type can lead to falsification of the SCR diagnosis results. Therefore, an evaluation of the SCR diagnosis in the context of the method according to the invention is expediently suspended during this phase. This is based on the fact that $NH_3$ is produced during a phase with a rich exhaust gas composition on account of the catalytic properties of the NSC, which $NH_3$ can no longer be converted completely in the NSC and exits from the NSC. The increased $NH_3$ concentration can be measured downstream of the NSC. If a NOx sensor is installed on the downstream side of the NSC in the exhaust gas system, the measured rise of the NOx sensor signal cannot be distinguished from a pure NOx rise on account of the cross-sensitivity of the NOx sensors with regard to $NH_3$ in the case of an $NH_3$ discharge during the NSC regeneration. Therefore, as long as the NOx measurement can be impaired, a diagnosis of the SCR catalytic converter expediently does not take place, since the diagnosis during the SCR monitoring can be inaccurate in a phase of this type.

In one preferred refinement of the method according to the invention, the blocking or interruption of the regeneration of the NSC is carried out in such a way that the regeneration of the NSC is blocked and/or interrupted during a calculation of SCR diagnosis criteria. As a result, in particular, the quality of the SCR diagnosis can be improved, since a more accurate monitoring result is possible by way of this measure. This is based on the fact that only low NOx concentrations occur in the exhaust gas on the downstream side of the NSC during the storage phase of the NOx emissions in the NSC in the case of satisfactory functionality of the NSC. On account of the system and NOx sensor tolerances, it is generally only conditionally possible in the case of very low NOx concentrations in the exhaust gas to achieve meaningful results during the monitoring of the SCR function, the monitoring usually being based on the calculation of the degree of efficiency during the NOx conversion in the SCR catalytic converter. In order therefore to improve the accuracy of the SCR monitoring, the regeneration of the NSC is blocked or interrupted during the calculation of the degree of efficiency or during the calculation of other SCR diagnosis criteria, with the result that the NSC is no longer discharged and there is a sufficient NOx concentration upstream of the SCR catalytic converter as a result, with the result that a more accurate monitoring result can be achieved.

In one preferred refinement of the method according to the invention, the regeneration of the NSC is blocked and/or interrupted if it is observed that a value for an SCR diagnosis criterion, for example for a degree of efficiency of the SCR catalytic converter, lies below a predefinable threshold value for distinguishing between a faulty and a non-faulty SCR catalytic converter. By way of the blocking of the NSC regeneration, the accuracy and quality of the SCR diagnosis and the precision of the SCR diagnosis are improved, since the NOx concentration which can be measured is increased on the downstream side of the NSC and the $NH_3$ quantities which are released during a regeneration are avoided. Thus, the diagnosis can be repeated with improved quality, in particular in borderline cases, in order for it to be possible to identify faults unambiguously. In addition, the frequency of the SCR diagnosis can be increased. As a result of the improved precision, furthermore, it is possible to determine an unambiguous threshold value between a functional SCR catalytic converter and a defective SCR catalytic converter which, for example, has aged to an excessive extent, with the result that the predefined threshold value can be adapted in some circumstances.

Furthermore, it can be advantageous to correspondingly vary the parameters for determining the valid operating points and possibly also with regard to the duration and speed of the calculation of the degree of efficiency during the escalation measure within the SCR monitoring function, in order also to further increase the robustness and accuracy of the SCR monitoring as a result.

In one particularly preferred refinement of the method according to the invention, during a calculation of the release conditions for the SCR diagnosis, a check is made as to whether the release of the SCR diagnosis is blocked on account of effects which are caused by a regeneration of the NSC. The regeneration of the NSC is blocked and/or interrupted in a manner which is dependent on a value which is dependent on said calculation of the release conditions of the SCR diagnosis. In particular, a check is made here as to whether the SCR diagnosis is blocked as a consequence of excessively low NOx emissions upstream of the SCR catalytic converter; said NOx emissions which are too low for the SCR diagnosis can be attributed to high efficiency of the NSC which is brought about by way of a frequent regeneration of the NSC. Therefore, a check is made here as to whether possible blocking of the SCR diagnosis is actually caused by the regeneration of the NSC. Only if this is actually the case is the regeneration of the NSC blocked and/or interrupted, with the result that said escalation measure is carried out only in the actual case of need. If the release of the SCR diagnosis is not blocked on account of effects of an NSC regeneration, the regeneration of the NSC is not blocked or interrupted. This avoids a situation where the regeneration of the NSC is superfluously blocked and/or interrupted. At the value which is dependent on the calculation of the release conditions for the SCR diagnosis, a NOx mass can be observed, for example, which could not be taken into consideration on account of the NSC-induced blocking of the SCR diagnosis. For example, the release condition with regard to the calculation of the SCR degree of efficiency can be checked continuously during the calculation of the release conditions for the SCR diagnosis. If, on account of said calculation of the degree of efficiency, the SCR diagnosis is blocked exclusively on account of NSC effects and/or NSC influences, that NOx mass can be integrated which was lost from the SCR diagnosis as it were as a result. If the integrated NOx mass reaches a defined threshold value, it can be assumed that at least one SCR diagnosis result has been missed as it were. The NSC regeneration can finally be blocked above a defined number of missed SCR diagnosis results.

Furthermore, the invention comprises a computer program which is set up to carry out the described steps of the diagnosis method. Furthermore, the invention comprises a machine-readable storage medium, on which a computer program of this type is stored, and an electronic control unit which is set up to carry out the diagnosis method. The realization of the diagnosis method according to the invention as a computer program or as a machine-readable storage medium or as an electronic control unit has the particular advantage that the method according to the invention can also be used, for example, in existing motor vehicles which have a corresponding exhaust gas aftertreatment system.

Further features and advantages of the invention result from the following description of exemplary embodiments in conjunction with the drawings. Here, the individual features can be implemented in each case per se or in combination with one another.

Figure 2A:
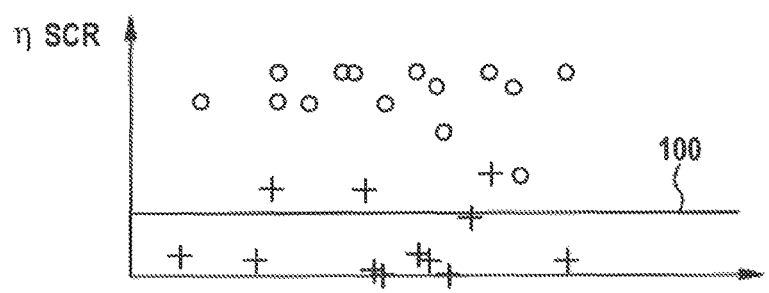
Figure 2B:
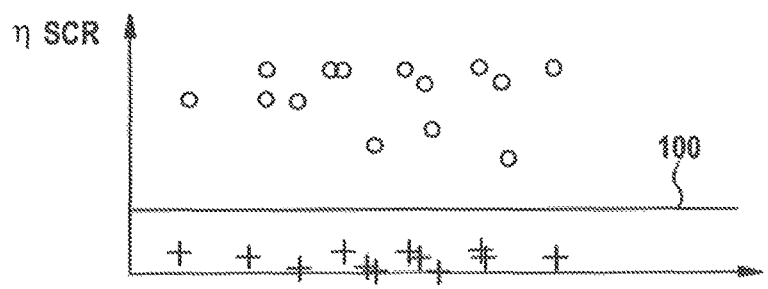
Figure 3A:
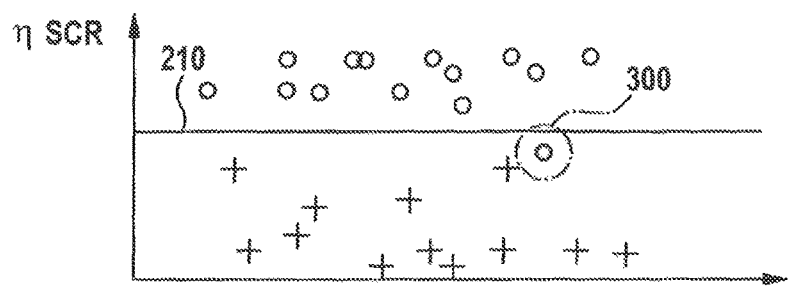
Figure 3B:
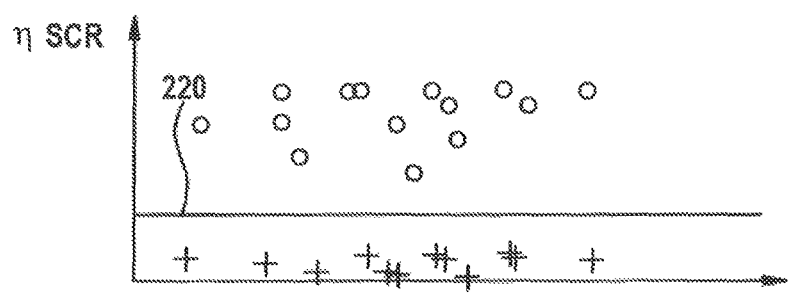
Figure 4:
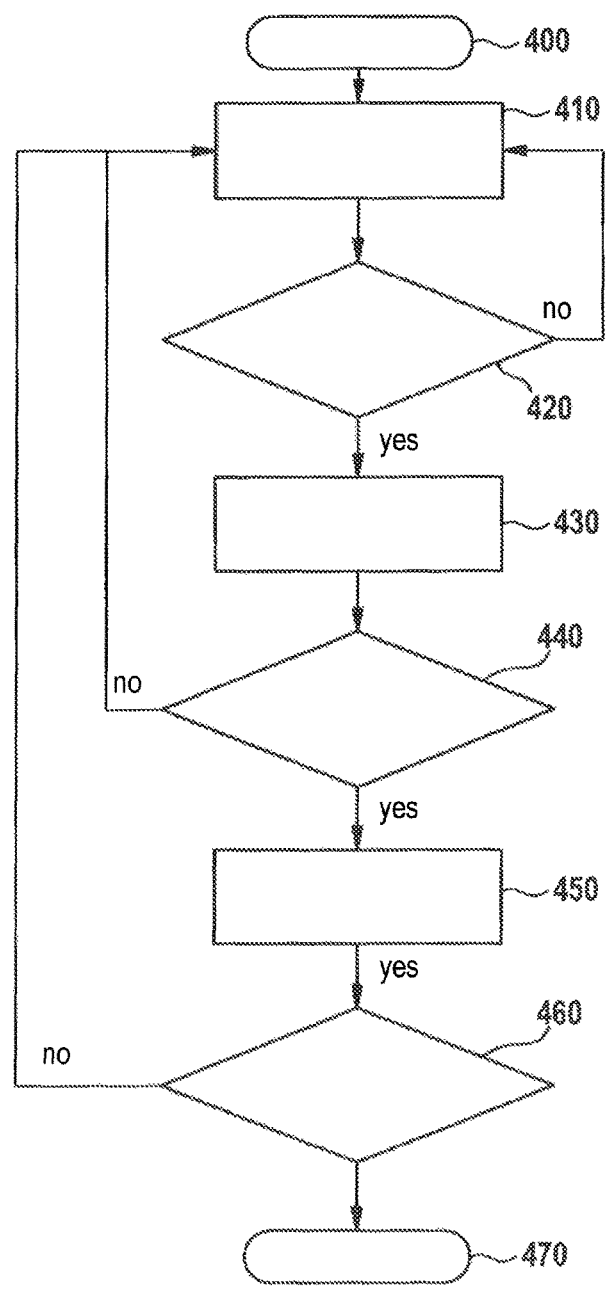

In the drawings:

FIG. 1 shows a diagrammatic illustration of one exemplary refinement of an exhaust gas aftertreatment system from the prior art, in which the method according to the invention can be used, FIGS. 2A and 2B show a diagrammatic illustration of degree of efficiency results during an SCR monitoring without blocking of the NSC regeneration (FIG. 2A) and with blocking of the NSC regeneration (FIG. 2B), FIGS. 3A and 3B show a diagrammatic illustration of the degree of efficiency results of an SCR monitoring without blocking of the NSC regeneration (FIG. 3A) and with blocking of the NSC regeneration (FIG. 3B), with adaptation of the threshold value for differentiating between a fault-free and faulty SCR catalytic converter, and FIG. 4 shows a schematic flow chart of one exemplary refinement of the diagnosis method according to the invention.

DETAILED DESCRIPTION

FIG. 1 diagrammatically shows an exemplary construction of an exhaust gas aftertreatment system from the prior art, in which the method according to the invention can be used. The exhaust gas section is shown of an internal combustion engine (not shown in greater detail), which exhaust gas section is flowed through by the exhaust gas in the direction of the arrow. The exhaust gas aftertreatment system comprises a NOx storage catalytic converter (NSC) 10, a particulate filter (cDPF) 20 and an SCR catalytic converter (SCR) 30. A metering point 40 for the required liquid reducing agent solution (for example, AdBlue®) is situated upstream of the SCR 30. In each case one lambda probe 11, 12 is situated upstream and downstream of the NSC 10. In each case one NOx sensor 31, 32 is situated upstream and downstream of the SCR 30. The NOx sensor 31 which is situated upstream of the SCR 30 can optionally be replaced by a calculated model value. An exhaust gas aftertreatment system of this type with an NSC 10 and an SCR 30 can, as described above, lead to problems, inter alia, during the SCR diagnosis in conventional operating and diagnosis methods, since the SCR diagnosis is influenced by the regeneration of the upstream NSC. In particular, problems can occur with the frequency and/or the quality of the SCR diagnosis. The invention solves this problem by a diagnosis method being provided, in which the regeneration of the NSC is blocked and/or interrupted in order to improve the frequency and/or quality of the SCR diagnosis. Here, the diagnosis method according to the invention can be used for exhaust gas aftertreatment systems which combine at least one NOx storage catalytic converter and at least one SCR catalytic converter with one another in the exhaust gas system. The SCR catalytic converter can also be present, for example, in the form of an SCR coating on a diesel particulate filter (SCR on filter—SCRF).

FIGS. 2A/B illustrate the influence of blocking of the NSC regeneration on the result of the SCR diagnosis. In the case which is shown here, the degree of efficiency of the SCR catalytic converter ($\eta$ SCR) is determined. A conclusion about the aging state of the SCR catalytic converter is possible using the degree of efficiency, with the result that this criterion is suitable as an SCR diagnosis criterion. For determining the degree of efficiency, the SCR catalytic converter is operated in normal, controlled metering operation for the reducing agent HWL (HWL—aqueous urea solution), and the NOx conversion rate of the SCR catalytic converter is determined by means of a calculation of the degree of efficiency with the aid of the present NOx sensors and/or corresponding model values. For demonstration purposes, the aqueous urea solution is replaced by water (or a similar liquid without catalytic properties). The circle elements in the figures represent the determined degree of efficiency which has been achieved during metering of the reducing agent HWL. The cross elements in the figures represent the determined degree of efficiency which has been determined during metering of water. Here, the use of water represents one possible fault which has to be shown, for example, during an OBD demonstration. In the case of the use of water, a correspondingly low or no measurable NOx conversion rate (degree of efficiency of approximately zero) is therefore to be expected in the SCR catalytic converter. The measured results which are shown represent results of a passive SCR diagnosis function in the context of a usual SCR diagnosis. The better the SCR catalytic converter can fulfill the NOx conversion, the higher the degree of efficiency result which is to be expected. Here, the threshold 100 denotes a predefined threshold value for distinguishing between a faulty and a non-faulty SCR catalytic converter. FIG. 2A illustrates the problem under consideration. The degree of efficiency results of the SCR monitoring without blocking of the NSC regeneration vary greatly. Even if only water is metered into the exhaust gas section upstream of the SCR catalytic converter instead of reducing agent, the SCR catalytic converter can still partially achieve unexpectedly satisfactory NOx conversion rates, since the $NH_3$ which is produced during the NSC regeneration can still be utilized in the SCR catalytic converter for reducing the nitrogen oxides. Therefore, the results with normal reducing agent metering can no longer be distinguished unambiguously from the results which are achieved during the metering of water. The predefined threshold value 100 is not suitable for distinguishing the two scenarios (fault-free SCR catalytic converter—faulty SCR catalytic converter), and the effectiveness of the SCR catalytic converter is not unambiguously demonstrable.

FIG. 2B illustrates the system behavior which arises if no more NSC regenerations take place according to the invention during the calculation of the SCR monitoring criteria or during the performance of the SCR diagnosis. During operation with water, the SCR catalytic converter can continuously achieve only very low NOx conversion rates on account of the lack of reducing agent. As a result, a more robust distinction is possible between the monitoring results with and without reducing agent metering. On account of the higher NOx concentrations on the downstream side of the NSC, it is possible here that additionally the frequency of the SCR diagnoses which are carried out can increase. The number of interruptions of the SCR monitoring as a consequence of an NSC regeneration is lower, as a result of which the duration of the individual monitoring cycles is likewise shortened.

FIGS. 3A/B illustrate the performance of the method according to the invention using the degree of efficiency results during the SCR monitoring without blocking of the NSC regeneration (FIG. 3A) and after blocking of the NSC regeneration (FIG. 3B), an adaptation of the threshold value 210, 220 having been performed for distinguishing between a faulty and non-faulty SCR catalytic converter. As a result, a faulty interpretation of the degree of efficiency result denoted by 300 can be avoided. As arises from the illustration in FIGS. 3A/B, it can occur depending on the application that the threshold value 210 is not selected in a fitting manner for distinguishing the result quality. In particular, it can occur that no unambiguous threshold value can be defined appropriately on account of the great variation of the results. In a case of this type, the blocking of the NSC regeneration as a measure according to the invention can be applied during an escalation measure for improving the accuracy and the frequency of the SCR diagnosis. If therefore, for example, an SCR degree of efficiency result 300 which lies below the predefined threshold value 210 is achieved under normal operating conditions, in which the NSC regeneration can also proceed during the SCR monitoring, the NSC regeneration is blocked for the further SCR monitoring, with the result that the NSC is no longer unloaded of NOx. As a result, the measurable NOx concentration is increased on the outflow side of the NSC. In addition, releasing $NH_3$ is avoided during the regeneration of the NSC which now no longer takes place. In this way, the accuracy of the SCR diagnosis is increased, as shown in FIG. 3B. In particular, the precision is increased between a faulty SCR catalytic converter (cross symbols—metering of water) and a non-faulty SCR catalytic converter (circle symbols—metering of HWL). It is possible as a result to determine an unambiguous threshold value 220 for distinguishing the two cases. A faulty incorrect diagnosis of the degree of efficiency result 300 is avoided by way of the measure according to the invention and the adaptation of the threshold value 220 during or after blocking of the NSC regeneration. According to the invention, the accuracy of the SCR diagnosis can therefore be increased in the event of doubt. Here, the blocking of the NSC regeneration is expediently initiated only in the escalation case, since a possible emissions influence by way of continuous blocking of the NSC regeneration is avoided as a result.

In conventional systems, the case can occur where, for example, a passive SCR diagnosis function has to be interrupted or blocked on account of the NSC operation, since unfavorable conditions prevail for the SCR catalytic converter. Said unfavorable conditions can be associated directly with the state of the NSC and the current status of the NSC regenerations or else can be influenced by the current operating conditions (temperature, NOx mass or concentration upstream of the SCR catalytic converter, etc.). If the calculation of the SCR monitoring criterion is then interrupted on account of unfavorable operating conditions, the result of the SCR monitoring is delayed temporarily. In unfavorable driving and system conditions, the SCR monitoring can therefore not be carried out often enough in some circumstances, with the result that the function of the SCR catalytic converter cannot be evaluated to a sufficient extent. In order to solve this problem and to increase the frequency of the SCR diagnoses, the number of NSC regenerations is limited according to the invention under certain circumstances, as will be explained in greater detail using FIG. 4. FIG. 4 illustrates one exemplary procedure for calculating the criteria which can lead to blocking of an NSC regeneration according to the method according to the invention. After the start 400 of the method, the release conditions for an SCR diagnosis are checked continuously in step 410 using an SCR degree of efficiency calculation. Here, an enquiry is made in step 420 as to whether the release condition which is possibly not present for the SCR diagnosis is caused by NSC effects and/or NSC influences. In particular, a check is made as to whether the release of the SCR diagnosis is blocked exclusively on account of NSC effects and/or NSC influences. If this is not the case, the procedure jumps back to step 410. If, however, the enquiry in step 420 reveals that this is the case, that NOx mass (mNOx) is integrated in step 430 which has as it were escaped the SCR diagnosis by way of said blocking. An enquiry is made in step 440 as to whether said integrated NOx mass reaches a predefinable threshold value (mNOxMin). Said threshold value represents the case, in which it is to be assumed that an SCR diagnosis result has been missed as it were. If the threshold value has not been reached during the enquiry in step 440, the procedure jumps back to step 410. If, however, the enquiry in step 440 reveals that the threshold value mNOxMin has been reached, the missed SCR diagnosis results are counted in step 450 (ctSCRRslt). An enquiry is made in step 460 as to whether a certain predefined number of missed SCR diagnosis results (ctSCRRsltMin) has been reached. If this is not the case, the procedure jumps back to step 410. If, however, the enquiry in step 460 reveals that ctSCRRsltMin has been reached or exceeded, the NSC regeneration is blocked and/or interrupted in step 470. Whereas the SCR diagnosis is currently active in the further course, the NSC regeneration can remain blocked until there is a result of the SCR diagnosis. Subsequently, the NSC regeneration can be released again.

During the escalation phase, furthermore, the number of permissible missed SCR diagnosis results (ctSCRRsltMin) which have to be reached for blocking of the NSC regeneration can also be lowered. As a result, the NSC regenerations can be blocked more rapidly and the SCR diagnosis can be activated earlier.

The invention claimed is:

1. A method for the diagnosis of an exhaust gas aftertreatment system for an internal combustion engine, the exhaust gas aftertreatment system having at least one NOx storage catalytic converter (10) and at least one SCR catalytic converter (30) which is arranged downstream of the NOx storage catalytic converter (10), the method comprising:
   calculating release conditions for the diagnosis of the SCR catalytic converter (30),
   determining if a release of the diagnosis of the SCR catalytic converter (30) is blocked due to a frequent regeneration of the NOx storage catalytic converter (10), and
   at least temporarily blocking a regeneration of the NOx storage catalytic converter (10) to improve the frequency, the quality, or both of the diagnosis of the SCR catalytic converter (30),
   wherein the blocking of the regeneration of the NOx storage catalytic converter (10) is based upon the calculation of the release conditions.

2. The method according to claim 1, wherein at least temporarily blocking the regeneration of the NOx storage catalytic converter (10) is carried out as an escalation measure.

3. The method according to claim 1, further comprising observing whether a provided frequency of the diagnosis of the SCR catalytic converter, a provided quality of the diagnosis of the SCR catalytic converter (30), or both are limited.

4. The method according to claim 1, wherein the regeneration of the NOx storage catalytic converter (10) is at least temporality blocked during a calculation of SCR diagnosis criteria.

5. The method according to claim 1, further comprising checking whether a release of the diagnosis of the SCR catalytic converter (30) is blocked because NOx concentrations which are too low for an SCR diagnosis are present upstream of the SCR catalytic converter.

6. The method according to claim 1, wherein the regeneration of the NOx storage catalytic converter (10) is not at least temporarily blocked if the release of the SCR diagnosis is not blocked on account of frequent regeneration of the NOx storage catalytic converter (10).

7. The method according to claim 1, wherein the regeneration of the NOx storage catalytic converter (10) is at least temporarily blocked if it is observed that a value for an SCR diagnosis criterion lies below a predefinable threshold value (210) for distinguishing between a faulty and a non-faulty SCR catalytic converter.

8. The method according to claim 7, wherein the threshold value (210) is adapted after the at least temporarily blocking of the regeneration of the NOx storage catalytic converter (10).

9. A non-transitory computer-readable storage medium comprising instructions configured to be executed on a computer which cause the computer to control an exhaust gas aftertreatment system for an internal combustion engine, the exhaust gas aftertreatment system having at least one NOx storage catalytic converter (10) and at least one SCR catalytic converter (30) which is arranged downstream of the NOx storage catalytic converter (10), the computer configured to control the exhaust gas aftertreatment system to
   calculate release conditions for the diagnosis of the SCR catalytic converter (30),
   determine if a release of the diagnosis of the SCR catalytic converter (30) is blocked due to frequent regeneration of the NOx storage catalytic converter (10), and
   at least temporarily block a regeneration of the NOx storage catalytic converter (10) in response to the determination to improve the frequency, the quality, or both of the diagnosis of the SCR catalytic converter (30), wherein the blocking of the regeneration of the NOx storage catalytic converter (10) is based upon the calculation of the release conditions.

10. An electronic control unit for an exhaust gas aftertreatment system for an internal combustion engine, the exhaust gas aftertreatment system including the electronic control unit, at least one NOx storage catalytic converter (10), and an SCR catalytic convertor (30) arranged downstream of the NOx storage catalytic convertor (10), the electronic control unit configured to
   calculate release conditions for the diagnosis of the SCR catalytic converter (30),
   check if a release of the diagnosis of the SCR catalytic converter (30) is blocked due to frequent regeneration of the NOx storage catalytic converter (10), and
   at least temporarily block a regeneration of the NOx storage catalytic converter (10) to improve the frequency, the quality, or both of the diagnosis of the SCR catalytic converter (30) of the exhaust gas aftertreatment system for the internal combustion engine, wherein the blocking of the regeneration of the NOx storage catalytic converter (10) is based upon the calculation of the release conditions.

* * * * *